US012081059B1

(12) United States Patent
Chandra et al.

(10) Patent No.: US 12,081,059 B1
(45) Date of Patent: Sep. 3, 2024

(54) SYSTEMS AND METHODS FOR PROVIDING A DISTRIBUTED BATTERY ARCHITECTURE

(71) Applicant: Meta Platforms Technologies, LLC, Menlo Park, CA (US)

(72) Inventors: Sachin Ramesh Chandra, Woodinville, WA (US); Karthik Kadirvel, Cupertino, CA (US); Ankur Gupta, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 153 days.

(21) Appl. No.: 17/577,352

(22) Filed: Jan. 17, 2022

Related U.S. Application Data

(60) Provisional application No. 63/228,804, filed on Aug. 3, 2021.

(51) Int. Cl.
*H02J 7/00* (2006.01)
(52) U.S. Cl.
CPC ........ *H02J 7/00712* (2020.01); *H02J 7/0013* (2013.01); *H02J 7/0063* (2013.01)
(58) Field of Classification Search
CPC ..... H02J 7/00712; H02J 7/0013; H02J 7/0063

USPC .......................................................... 307/24
See application file for complete search history.

(56) References Cited

U.S. PATENT DOCUMENTS

| | | | |
|---|---|---|---|
| 2014/0298447 A1* | 10/2014 | Chu ................... | H04B 5/0037 726/18 |
| 2016/0226280 A1* | 8/2016 | Noor ................. | G01R 31/3648 |
| 2016/0264013 A1* | 9/2016 | Kim .................... | B60L 53/665 |
| 2018/0166906 A1* | 6/2018 | Malhotra ............... | H04B 5/00 |
| 2019/0067755 A1* | 2/2019 | Kim ...................... | H02J 7/0014 |
| 2019/0081370 A1* | 3/2019 | Capati ................. | H01M 10/425 |
| 2020/0097082 A1* | 3/2020 | Berenzweig ............ | G06F 3/014 |
| 2021/0378903 A1* | 12/2021 | Mooney .................. | A61H 3/00 |
| 2021/0384740 A1* | 12/2021 | Miles .................. | H02J 7/00032 |
| 2022/0395417 A1* | 12/2022 | Mooney ............... | A61F 5/0127 |

* cited by examiner

*Primary Examiner* — Michael R. Fin
(74) *Attorney, Agent, or Firm* — Greenberg Traurig, LLP

(57) ABSTRACT

The disclosed system may include multiple electronic components and multiple charger battery modules. Each charger battery module may include: at least one battery configured to drive at least one of the electronic components, at least one battery charger configured to charge the battery, and a microcontroller configured to control the charging and discharging of the battery. The system may also include a central controller that may be configured to control the various charger battery modules through each charger battery module's associated microcontroller. Various other methods, systems, and computer-readable media are also disclosed.

20 Claims, 12 Drawing Sheets

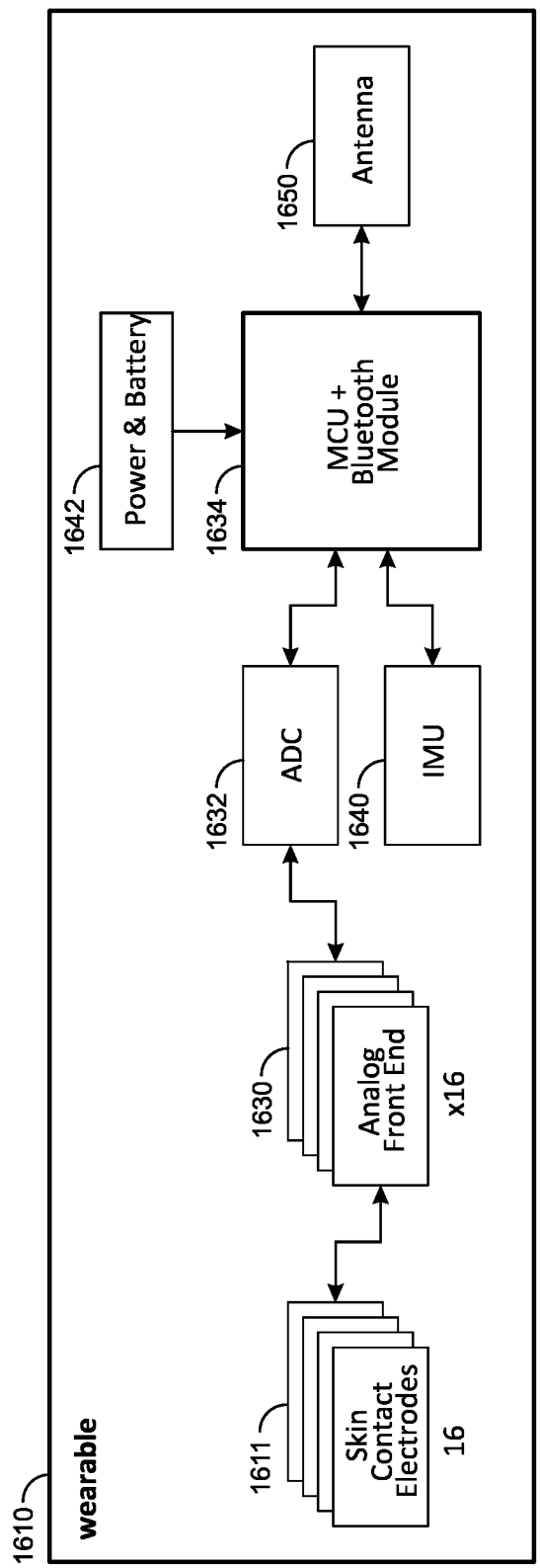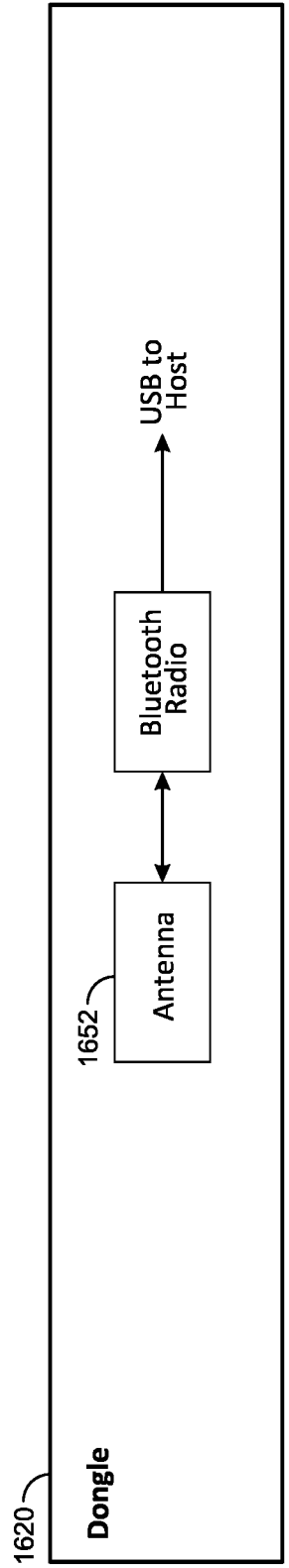
*FIG. 16A*
*FIG. 16B*

SYSTEMS AND METHODS FOR PROVIDING A DISTRIBUTED BATTERY ARCHITECTURE

CROSS REFERENCE TO RELATED APPLICATION

This application claims priority to U.S. Provisional Application No. 63/228,804, filed Aug. 3, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 16A and 16B are illustrations of an exemplary schematic diagram with internal components of a wearable system.

Figure 1:
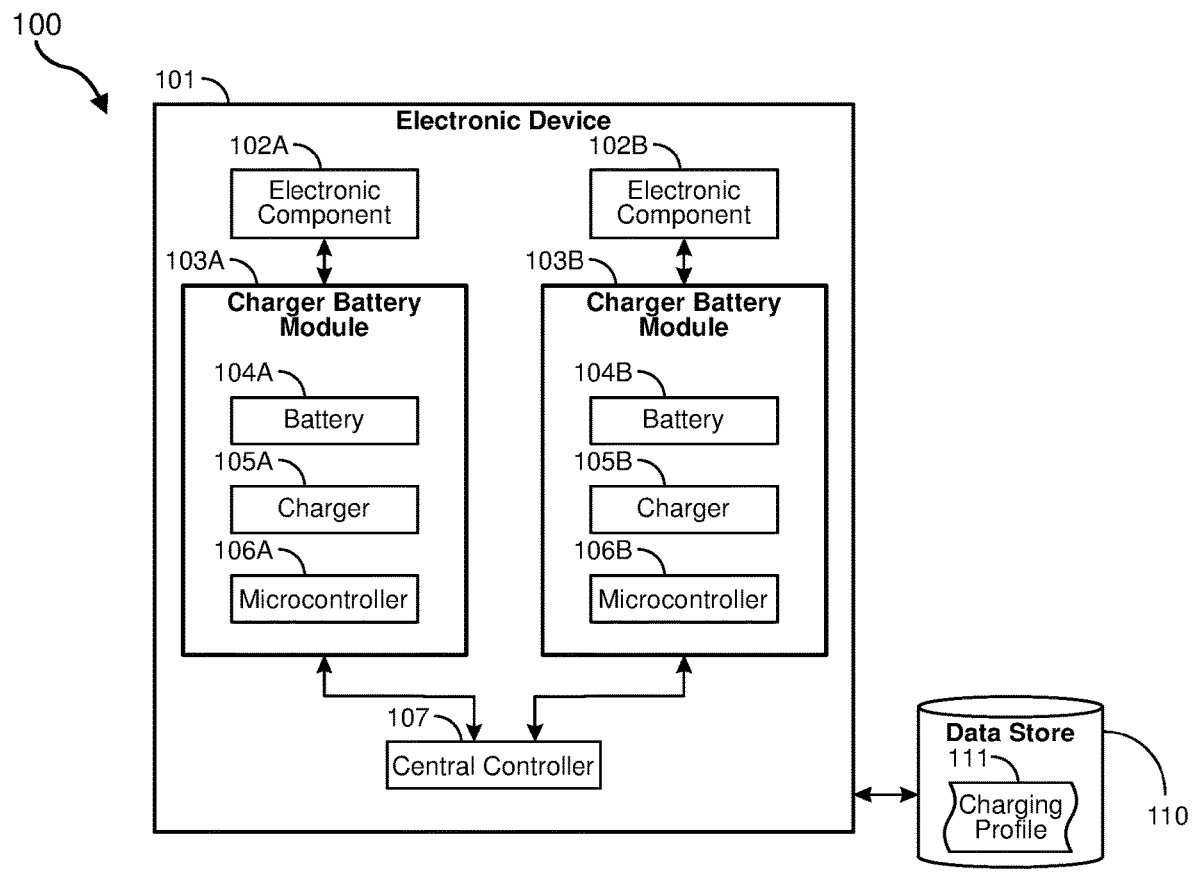
FIG. 1 illustrates an example embodiment of an electronic device including a distributed battery architecture.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems, methods, and apparatuses for providing improved battery management in wearable or other battery-operated devices. In some cases, electronic devices with a small form factor, such as AR glasses or head-mounted displays, may have batteries that are positioned relatively far away from the various electronic components of the device. These electronic components may include processors, cameras, speakers, or other battery loads. This positioning of batteries far from their respective loads is most often due to space constraints in these smaller, often portable devices. For instance, batteries may be pushed to locations that are farther away from the load because those locations have more space to house the battery. The batteries are often linked to their respective loads via electronic connectors such as flex connectors. Because the batteries are located far from their respective loads, in these examples, power may be lost (e.g., in the flex connectors) during the transfer from the batteries to the loads.

In the embodiments described herein, the batteries may be positioned much closer to each load (i.e., close to specific electronic components) through the use of "charger battery modules" or CBMs. These CBMs may be self-contained modules that include both batteries and battery charging units, as well as one or more microcontrollers that control charging and discharging of that battery. The CBM may also be connected to a central controller that sends control signals to multiple CBMs within an electronic device. The microcontroller of each CBM may not only control how each battery is charged but may also control how each battery is discharged. Then, based on electronic device usage or even electronic component usage (e.g., heavy audio speaker use or heavy camera use), the central controller may direct the CBMs attached to those loads to charge more quickly when connected to power. Adding CBMs that are physically close to each load may increase overall power efficiency for the device, allowing the device to perform longer on each charge.

In some cases, the central controller may implement different charging patterns or profiles for different types of batteries or different types of device usage. For example, the central controller may use machine learning to optimize how each battery is charged or discharged based on device usage patterns. The central controller may then apply charging patterns that match the detected type of usage. The central controller may also control the charging of each battery based on different factors including the age of the battery, the temperature of the battery, the type of the battery, or other factors. The CBM architecture described herein may be designed to work with substantially any battery type in virtually any electronic device. Controlling the charging and/or discharging of the battery in this customizable and battery-specific manner may also extend the useful life of each battery in an electronic device.

Still further, as noted above, placing CBM's closer (proximity-wise) to the point of load may increase power delivery efficiency, as each battery is located next to or substantially next to the load. For example, at least in some cases, the battery may directly abut the load or may be adjoined to the load. In other cases, the battery may only have a very short lead to the load (e.g., 1 mm, 2 mm, 3 mm, etc.). In some embodiments, as will be explained further below, the centralized battery management system may use machine learning to estimate how each CBM may be operated (i.e., charged or discharged) based on electronic device usage patterns (e.g., as used by end users). For example: if an end user operates their device in a manner that more heavily uses audio speakers, then the CBM's near the audio speakers may be prioritized for charging and may receive more input power than other CBMs. Alternatively, if the user operates their device more heavily with a camera, with a particular wireless radio (e.g., WiFi or Bluetooth), with a particular type of sensor, or with other electronic components, the CBMs near those components may be prioritized for charging and/or discharging and may do so in a controlled manner.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-16B, detailed descriptions of different embodiments for providing and implementing a distributed battery architecture. FIG. 1, for example, may illustrate an embodiment 100 of an electronic device 101. The electronic device 101 may be substantially any type of electronic device including portable electronic devices such as mobile phones, artificial reality devices including glasses or headsets, music players, or any other electronic device that implements at least one battery. The electronic device 101 may include one or more electronic components 102A/102B. These electronic components may include processors, cameras, touchscreens, sensors, speakers, microphones, radios (e.g., WiFi, Bluetooth, cellular, etc.), systems on a chip (SoCs), or other components that run on power supplied by batteries.

In at least some embodiments, each electronic component or "load" may have its own charger battery module (CBM). Thus, in FIG. 1, electronic component 102A has its own CBM 103A, and electronic component 102B has its own CBM 103B. In some cases, each electronic component may have its own CBM, while in other cases, multiple components may share a CBM. Or, in other words, a single CBM may provide power to multiple electronic components. In the electronic device 101 of FIG. 1, each CBM may include multiple components including a battery 104A/104B, a charger 105A/105B, and a microcontroller 106A/106B. The battery may be substantially any type of battery (e.g., lithium ion, cell (disc), nickel cadmium, etc.) or any size of battery. Each battery may have its own charging and discharging characteristics. These may be identified and used to provide optimal charging and discharging profiles for each battery and each battery type implemented in the electronic device 101. The battery charger 105A/105B may be any component or set of electronic components configured to provide power to and charge a battery. Still further, the CBMs 103A/103B may include one or more microcontrollers 106A/106B. The microcontrollers may be programmable logic devices (PLDs), electronically programmable read only memory devices (EPROMs), SoCs, or any other kind of special purpose processing devices.

The microcontroller of each CBM may be in communication with a central controller 107. Thus, in an electronic device that has multiple batteries and multiple electronic components, a central controller 107 may communicate with the various microcontrollers of the different CBMs to provide general control instructions that apply to multiple CBMs. In some cases, the central controller (which may be any type of general or special purpose processor) may control each of the CBMs in the same manner, while in other cases, the central controller 107 may provide unique charging or discharging instructions to a single CBM or to a specific subset of CBMs. In some cases, this subset of CBMs may be dynamically determined based on which electronic components are being more heavily used within an electronic device. The central controller 107 and/or the respective microcontrollers 106A/106B may implement different battery charging or discharging profiles 111. These profiles 111 may be stored in a data store 110. This data store 110 may be located within the electronic device 101, or may be located remotely (e.g., in the cloud or in some other distributed data store).

Figure 2:
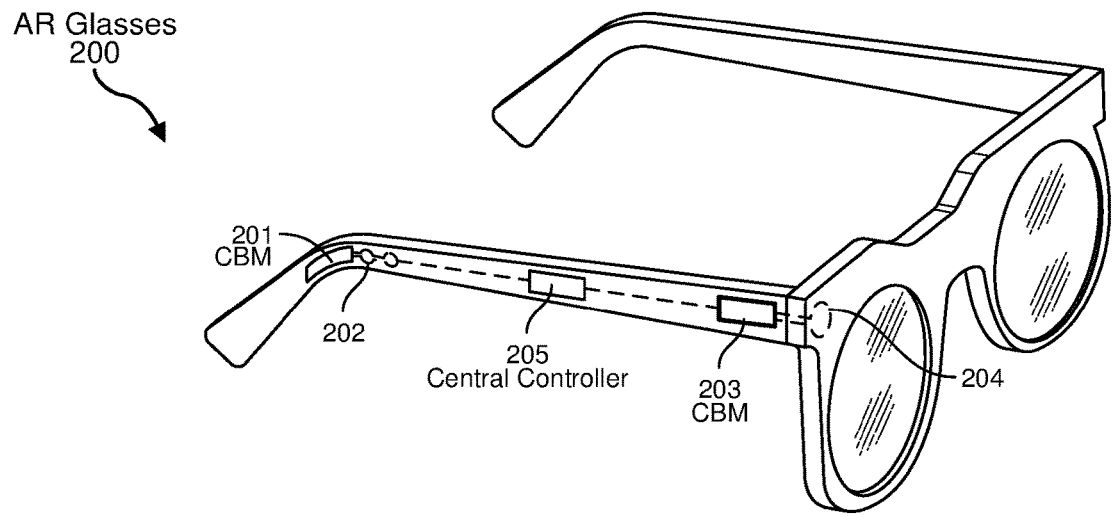
FIG. 2 illustrates an example embodiment of a distributed battery architecture implemented in artificial reality glasses.

FIG. 2 illustrates an embodiment of a pair of artificial reality glasses 200 that has multiple electronic components and a distributed battery architecture. The artificial reality glasses 200 have audio speakers 202 and a charger battery module 201 located substantially adjacent to the audio speakers 202. Furthermore, the artificial reality glasses 200 may have an integrated camera 204. The camera 204 may also have its own CBM 203 that is substantially adjacent to or abutting the camera. Other electronic components (not shown) may also have their own CBMs that individually manage the charging and discharging of those components. The central controller 205 may communicate with and provide control instructions to the microcontrollers of the CBMs 201 and 203. Because each battery is individually controlled and placed immediately next to (or at least within 1-3 mm) its respective load, the embodiments described herein may provide more efficient power transfer from the batteries to the loads, with fewer transmission losses or other parasitic losses that may occur on longer power paths to the components. Moreover, power usage (including charging and discharging) may be controlled for each electronic component separately within the electronic device. This may lead to further power savings, as each CBM may be optimized for its corresponding load(s) and/or battery type(s).

Figure 3A:
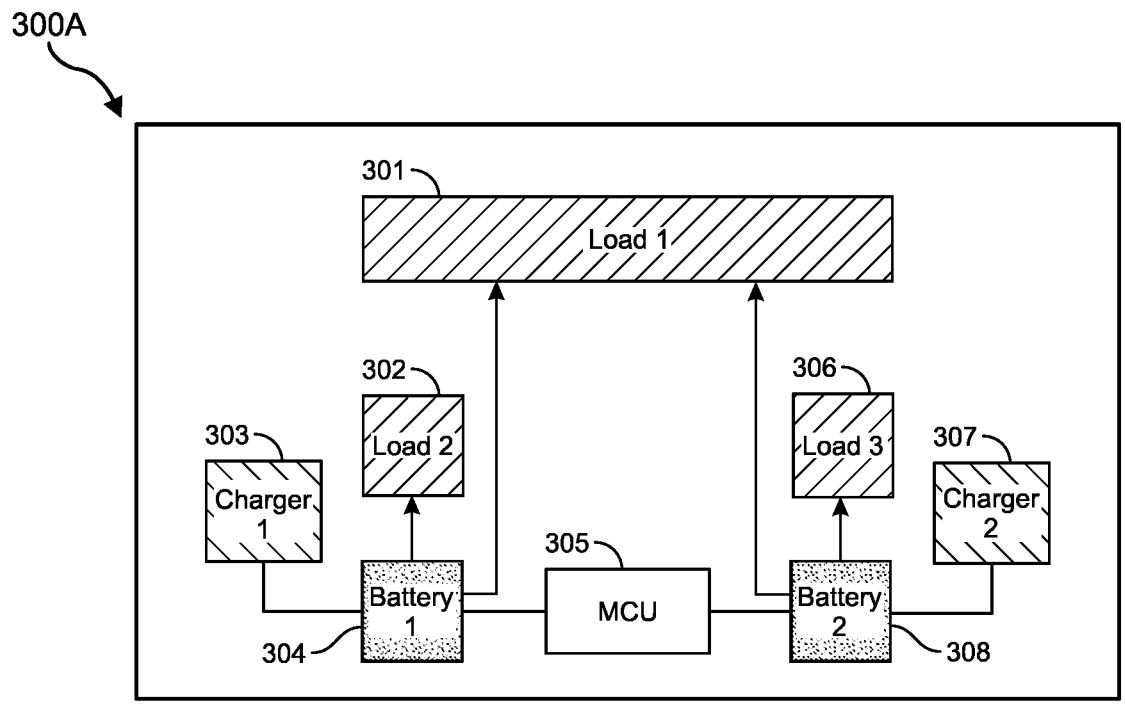
FIG. 3A illustrates an embodiment in which a non-distributed battery architecture is provided.
Figure 3B:
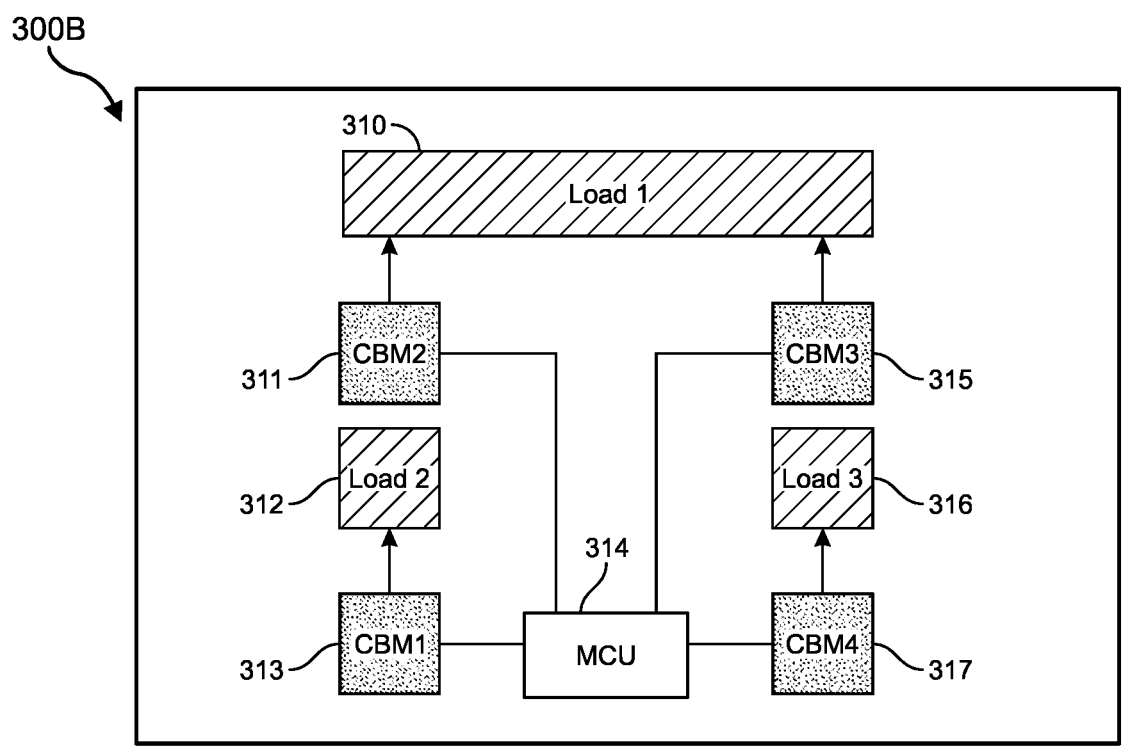
FIG. 3B illustrates an embodiment in which a distributed battery architecture is provided.

FIGS. 3A and 3B illustrate contrasting embodiments 300A/300B in which power is provided to different loads. In the embodiment 300A, two batteries (304 and 308) provide power to three different loads (301, 302, and 306). While the batteries 304 and 308 may be relatively close to loads 302 and 306, the batteries are quite far away from load 301, resulting in a potential loss of power reaching load 301. Each battery 304/308 may have a corresponding charger 303/307, and the discharge of the batteries may be controlled by a master controller 305. However, in this embodiment, the chargers 303 and 307 may not be controlled by the master controller 305 and, as such, may simply charge the batteries without any intelligent controls or without any charging profiles.

In contrast, the embodiment 300B of FIG. 3B may include four charger battery modules that are each dispersed throughout the underlying device and are in closer proximity to their respective loads. For example, CBMs 313 and 317 are substantially next to their respective loads 312 and 316, while CBMs 311 and 315 are substantially next to load 310 which is powered by both CBMs 311 and 315. Each of these CBMs may include a battery, a charger, and a microcontroller (as shown in FIG. 1), among potentially other electronic components. Each of the CBMs may be separately controlled by a master controller 314. The master controller may control both the charging and the discharging of each batter (in each CBM) separately. Thus, if different loads are being used more heavily than others, charging power may be prioritized to those CBMS to ensure that those loads continually have the power they need to function properly.

Figure 4:
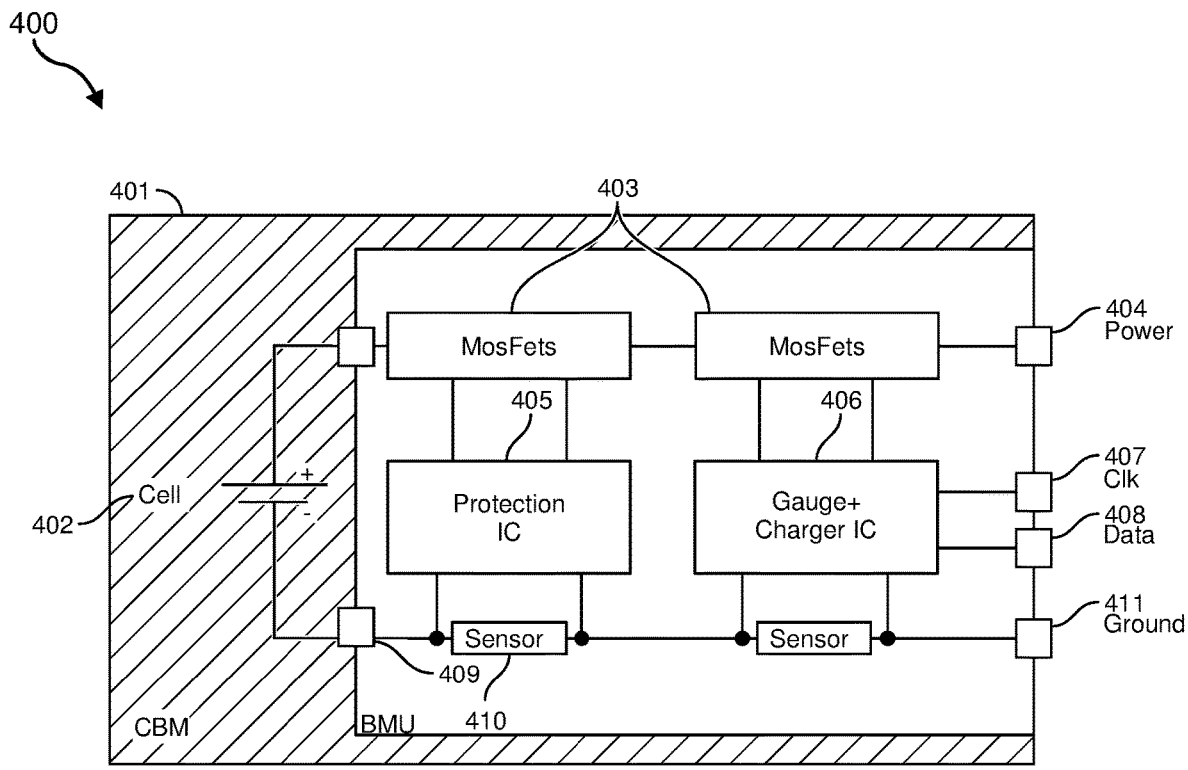
FIG. 4 illustrates an alternative embodiment in which a distributed battery architecture is provided.

FIG. 4 illustrates an embodiment 400 of a diagram of a charger battery module 401. The CBM 401 may include a cell battery 402 or any other type of battery. The cell battery 402 may be connected (via connections 409) to transistors 403 which may be metal-oxide-semiconductor field-effect transistors (MOSFETs) or other types of transistors. The transistors may act to route power 404 through protection integrated circuits 405 and/or gauge and charger integrated circuits (ICs) 406, each of which may be electrically connected to sensors 410 that detect how much power is flowing through the respective (ICs). The protection IC 405 may be configured to regulate the amount of power flowing to each component and may ensure that a maximum amount of power is not exceeded. This may help to protect each electronic component from receiving more power than it is designed to receive. The gauge and charger IC 406 may be configured to determine how much power is being discharged by each load and may be configured to control how each battery in the CBM 401 is charged. Each CBM 401 may also include a ground node 411, a clock 407, and a data input node 408 to receive input data from a central controller or from other CBMs. In some cases, as will be explained further below, machine learning may be implemented to determine how to control the charging and/or discharging of each battery in each CBM in an electronic device.

Figure 5:
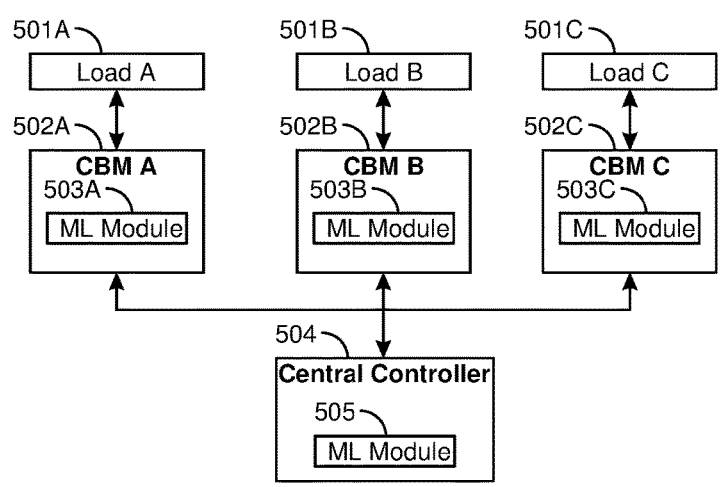
FIG. 5 illustrates an embodiment in which machine learning is implemented to control a distributed battery architecture.

As shown in FIG. 5, for example, a system may include multiple electronic components or loads 501A, 501B, and 501C. Each load may have its own charger battery module 502A, 502B, or 502C, respectively. Each of these CBMs may include at least one battery configured to drive the corresponding electronic components, a battery charger configured to charge the battery, a microcontroller configured to control the charging and discharging of the battery, and a machine learning module 503A/503B/503C. The machine learning modules may include substantially any type of software and/or hardware configured to perform machine learning, including training ML models and implementing those models. The ML modules may work in tandem with the central controller 504 to control the charging and discharging of the batteries in each CBM.

In some cases, the microcontroller of each CBM may be configured to regulate charging and discharging of a battery according to load usage of the electronic components. In some examples, the microcontrollers and/or the central controller 504 may be configured to implement machine learning to learn which electronic components are being used. Indeed, the ML modules of each CBM may implement machine learning to track load usage over time and track how each battery is charged. This may allow the CBMs and/or the central controller to generate a usage profile that is specific to each battery and each load. The usage profile may determine that some components are used more often than others, or are used at certain times of day, or are used in certain environments (e.g., when the user of the device is exercising or is at work or is recreating).

The embodiments described herein may be configured to implement machine learning to learn how each electronic component is individually being used and may generate usage profiles for each load and each battery powering that load. In some cases, each CBM may have its own ML module that trains its own unique ML model. Additionally or alternatively, the central controller 504 may have its own ML module 505 that may train an ML model to manage a system of CBMs. This higher level of control may look at how the various CBMs and loads are acting, including noting charging and discharging behaviors, and then tailoring controls to optimize battery charging and discharging across the various CBMs in a device.

In some embodiments, the machine learning (whether at the CBM level or at the central controller level) may be implemented to adaptively adjust charging and/or discharging of the battery based on current electronic component usage. Thus, the embodiments described herein may implement machine learning to track (in real time or near real time) how each battery is being charged by a charger and/or discharged by a corresponding load. Some loads may discharge the battery faster, or some environments may cause the battery to drain more quickly. The ML modules in the CBMs and/or in the central controller may dynamically monitor battery usage and may channel input power (e.g., from a wall outlet) to those batteries first, or may even channel stored battery power from other batteries in other CBMs to batteries and loads that are currently being used.

Thus, certain batteries and loads may be prioritized over other batteries and loads once the underling electronic device is plugged in to a power source. The machine learning may adaptively adjust this charging and discharging of the batteries over time as usage changes, as environments change (e.g., as temperature increases or decreases), or as different components are used more heavily or less heavily than others. Still further, these adaptive adjustments may be made not only based on usage but may also change for each battery type. Thus, if some batteries charge better in a slow, steady manner or in a quick burst, or if some battery types are better at providing slow, steady power or short bursts of power, the ML modules may learn these characteristics and may charge or discharge the batteries accordingly.

Figure 6:
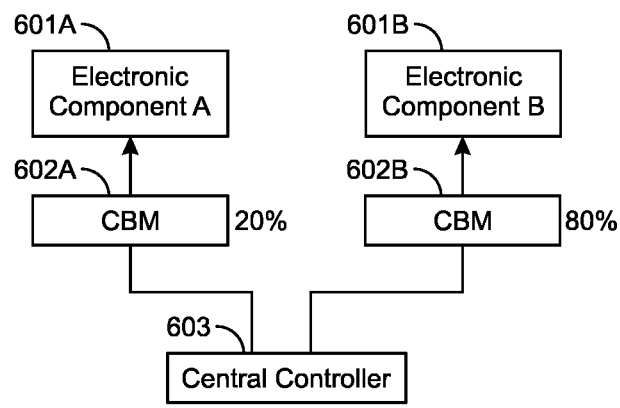
FIG. 6 illustrates an embodiment in which load is distributed disproportionately among electronic components.

FIG. 6 illustrates an example embodiment in which battery charging and discharging are prioritized to one electronic component over another. For example, an electronic device may have multiple electronic components including components 601A and 601B. Each electronic component may have a corresponding charger battery module 602A/602B. The central controller 603 may determine that component 601B is being used more heavily than component 601A. As such, in this example, the central controller 603 may indicate that CBM 602A is to receive 20% of the incoming power and CBM 602B is to receive 80% of the incoming power. Thus, if both electronic components 601A/601B have drawn on their batteries in CBMs 602A/602B, and both batteries need to be charged, because the central controller 603 has determined, in this example, that component 601B is more heavily used (and is more likely to be used in the future), 80% of the incoming power (e.g., from a wall outlet or from a wireless power supply) is to be diverted to the CBM 602B of component 601B, while 20% of the power is to be diverted to CBM 602A of component 601A. If usage changes over time, the central controller 603 may change the prioritization to 30/70, 50/50, 100/0 or to some other level. Indeed, in some cases, the central controller 603 may prioritize charging using one CBM, while avoiding charging entirely on other CBMs under its control. Thus, the central controller 603 may dynamically determine power needs and may change the prioritization among CBMs accordingly, continually varying the percentage of input power each CBM receives.

Figure 7:
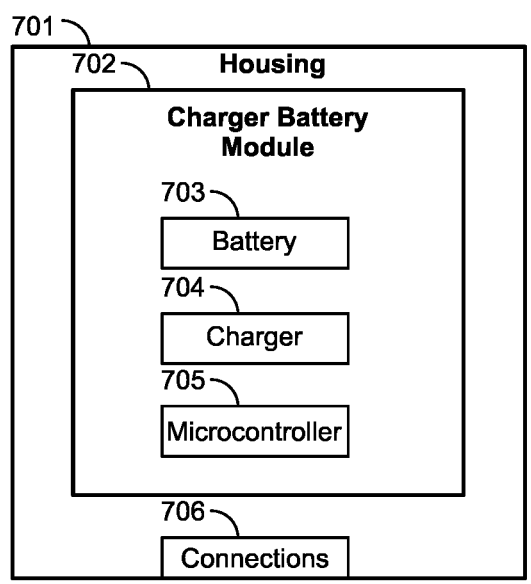
FIG. 7 illustrates an embodiment in which a charger battery module housing is provided.

FIG. 7 illustrates an example in which an apparatus may include a charger battery module 702. The charger battery module may include a battery 703 configured to drive at least one electronic component, a battery charger 704 configured to charge the battery 703, and a microcontroller 705 configured to control the charging and discharging of the battery 703. The apparatus may also include a central controller (not shown) that is configured to control the charger battery module 702 through the charger battery module's associated microcontroller 705. In some case, as shown in FIG. 7, the charger battery module 702 may include a separate housing 701 that houses the battery, the battery charger, and the microcontroller in a single unit. These housings may include connections 706 for power and/or data and allow each CBM to be packaged as a separate, standalone component. The CBM 702 with its attendant housing 701 may be added to substantially any electronic device in nearly any location. This may allow the CBMs to be installed or otherwise placed in positions that are abutting or very near the electronic components they power.

Figure 8:
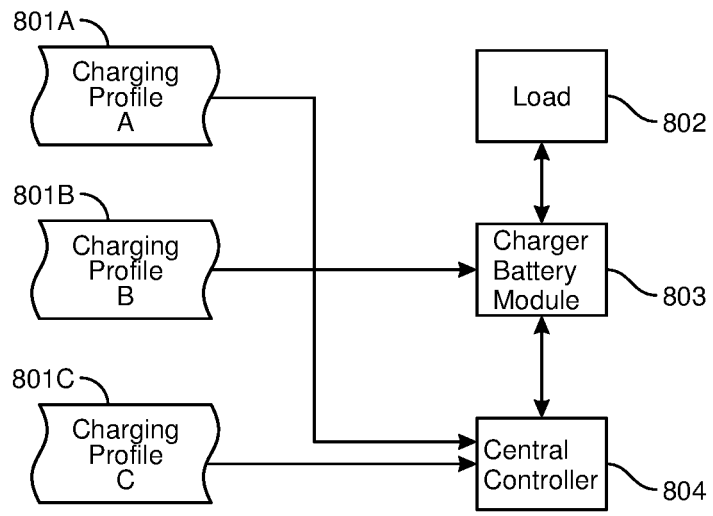
FIG. 8 illustrates an embodiment in which different battery charging profiles are implemented by the charger battery module and/or the central controller.

FIG. 8 illustrates an embodiment in which a central controller may apply various charge profiles on specific charger battery modules. For instance, central controller 804 may apply charging profiles 801A, 801B, or 801C when controlling load 802 through CBM 803. Additionally or alternatively, the CBM 803 may charge according to charging profiles 801A-801C depending on external conditions, usage patterns, or other factors. For example, a charging profile may indicate that CBM 803 is to be prioritized over other CBMs. For instance, charging profile 801A may indicate that CBM is to be charged at the highest possible rate, while charging profiles 801B/801C may indicate that the CBM is to be charged at lower rates. If circumstances change (e.g., the user begins performing a different activity or the device is introduced into a new environment (e.g., a hot environment)), a different charging profile may be applied (e.g., charging profile 801C may indicate that the battery in CBM 803 is to be charged at a slower rate to reduce heat accumulation). Thus, different charging profiles may be applied for different types of batteries, for different loads, for different environments, or based on different battery usage levels. The embodiments herein may be designed to adaptively determine which charging (or discharging) profile is best at each moment and may make dynamic changes to different profiles as needed to maintain optimum charging and discharging of each battery within a device.

Figure 9:
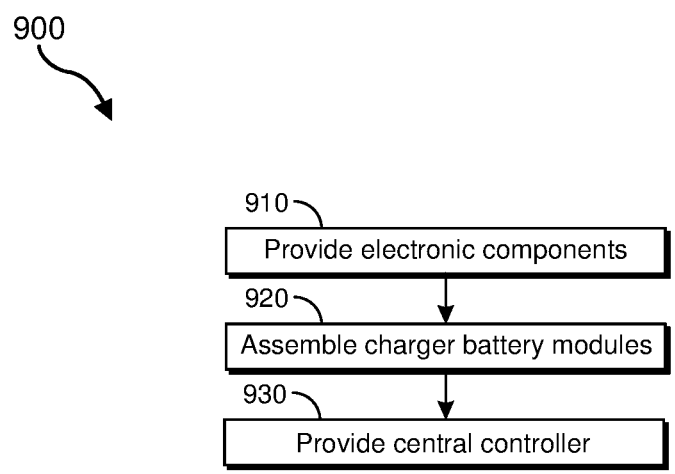
FIG. 9 is a flow diagram of an exemplary method of manufacturing an electronic device with a distributed battery architecture.

FIG. 9 is a flow diagram of an exemplary computer-implemented method 900 for manufacturing an electronic device having a distributed battery architecture. The steps shown in FIG. 9 may be performed by any suitable computer-executable code and/or computing system, including the systems described herein. In one example, each of the steps shown in FIG. 9 may represent an algorithm whose structure includes and/or is represented by multiple sub-steps, examples of which will be provided in greater detail below.

Method 900 of FIG. 9 may include, as part of a method of manufacturing, providing multiple electronic components at step 910. These electronic components may include wireless network cards, audio speakers, cameras, processors, memory, sensors, or other types of electronic components. The method 900 may further include, at step 920, assembling multiple charger battery modules, where each charger battery module may include: at least one battery configured to drive at least one of the electronic components, at least one battery charger configured to charge the battery, and at least one microcontroller configured to control the charging and discharging of the battery. In some cases, the components of the charger battery module may be housed together within a single housing. Moreover, at least in some cases, the charger battery modules may be assembled, placed, or otherwise positioned substantially next to the loads they are providing power to. Thus, at least in some cases, each electronic component in a device may have its own corresponding charger battery module.

The method 900 may also include, at step 930, providing a central controller that may be configured to control the various charger battery modules through the charger battery module's associated microcontroller. The central controller may communicate with and control each of the CBMs within a device by communicating with and sending commands to the CBM's microcontroller. In some cases, the CBMs may provide feedback to the central controller indicating how the battery is being charged or discharged. The central controller may take this feedback into consideration when controlling the CBMs and may make changes to charge or discharge the batteries in another manner or according to a different charging profile.

In this manner, methods and systems may be provided that may implement or may themselves provide a distributed battery architecture. The distributed battery architecture may place each battery of a device closer to its load. Moreover, the distributed nature of the CBMs and central controller may allow a separate CBM for each electronic component. Thus, instead of having a single battery provide power to multiple components at relatively great distances, the embodiments here may provide multiple different batteries, each individually controlled and collectively guided, that are positioned substantially next to their respective loads. This may increase power transfer efficiency and may increase battery life by controlling charging and discharging of each battery according to its battery type.

EXAMPLE EMBODIMENTS

Example 1: A system may include: a plurality of electronic components, a plurality of charger battery modules, wherein each charger battery module includes: at least one battery configured to drive at least one of the electronic components, at least one battery charger configured to charge the battery, and a microcontroller configured to control the charging and discharging of the battery, and a central controller configured to control the plurality of charger battery modules through the charger battery module's associated microcontroller.

Example 2: The system of Example 1, wherein at least one of the charger battery modules is positioned adjacent a specified electronic component in the system.

Example 3: The system of any of Examples 1 or 2, wherein the microcontroller regulates charging and discharging according to load usage of the electronic components.

Example 4: The system of any of Examples 1-3, wherein the microcontroller is part of a system on a chip (SoC).

Example 5: The system of any of Examples 1-4, wherein at least one of the microcontroller or the central controller are configured to implement machine learning to learn which electronic components are being used.

Example 6: The system of any of Examples 1-5, wherein at least one of the microcontroller or the central controller are configured to implement machine learning to learn how electronic components are being used.

Example 7: The system of any of Examples 1-6, wherein the machine learning is implemented to adaptively adjust charging or discharging of the battery based on current electronic component usage.

Example 8: The system of any of Examples 1-7, wherein the machine learning is implemented to adaptively adjust charging or discharging of the battery based on a specific type of electronic component usage.

Example 9: The system of any of Examples 1-8, wherein at least one of the microcontroller or the central controller prioritizes charging or discharging for a specified electronic component.

Example 10: The system of any of Examples 1-9, wherein at least one of the microcontroller or the central controller change a charging or discharging profile for each battery type.

Example 11: The system of any of Examples 1-10, wherein at least one of the charger battery modules includes a separate housing that houses the battery, the battery charger, and the microcontroller.

Example 12: The system of any of Examples 1-11, wherein the plurality of charger battery modules are electronically linked to each other and separately to the central controller.

Example 13: An apparatus that includes a plurality of electronic components, a plurality of charger battery modules, wherein each charger battery module includes: at least one battery configured to drive at least one of the electronic components, at least one battery charger configured to charge the battery, and a microcontroller configured to control the charging and discharging of the battery, and a central controller configured to control the plurality of charger battery modules through the charger battery module's associated microcontroller.

Example 14: The apparatus of Example 13, wherein the central controller applies one or more charge profiles on specific charger battery modules.

Example 15: The apparatus of any of Examples 13 or 14, wherein applied charge profile is selected based on one or more current external conditions.

Example 16: The apparatus of any of Examples 13-15, wherein applied charge profile is selected based on previous electronic component usage patterns.

Example 17: The apparatus of any of Examples 13-16, wherein the central controller prioritizes charging using a specified charger battery module, while avoiding charging on at least one specified charger battery module.

Example 18: The apparatus of any of Examples 13-17, wherein the apparatus comprises an artificial reality device that includes at least one camera and one or more audio speakers.

Example 19: A method of manufacturing may include: providing a plurality of electronic components, assembling a plurality of charger battery modules, wherein each charger battery module includes: at least one battery configured to drive at least one of the electronic components, at least one battery charger configured to charge the battery, and a microcontroller configured to control the charging and discharging of the battery, and providing a central controller configured to control the plurality of charger battery modules through the charger battery module's associated microcontroller.

Example 20: The method of manufacturing of Example 19, wherein at least one of the charger battery modules is assembled adjacent to at least one electronic component.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
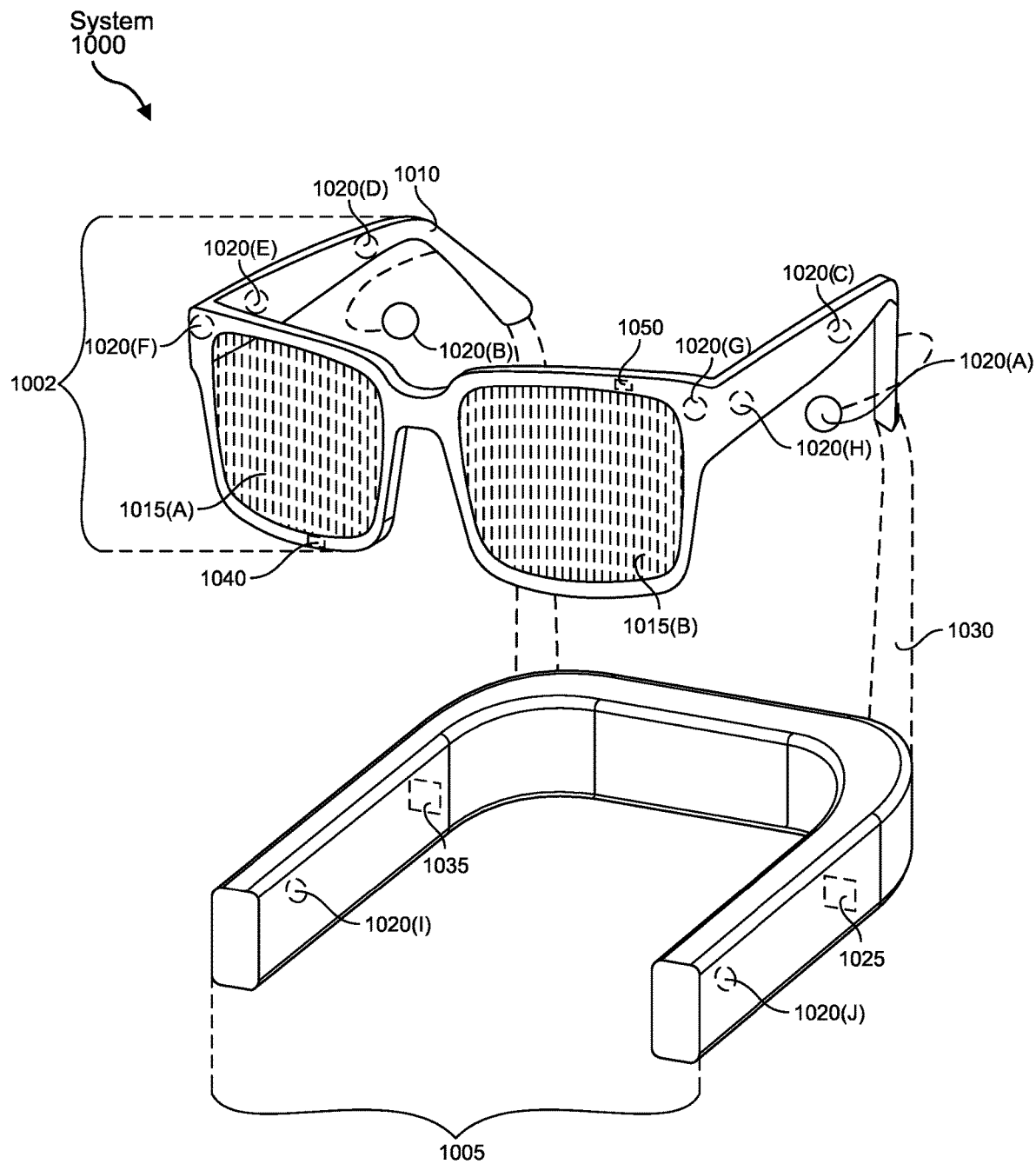
FIG. 10 is an illustration of exemplary augmented-reality glasses that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/ or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(*I*) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(*I*) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1000 and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
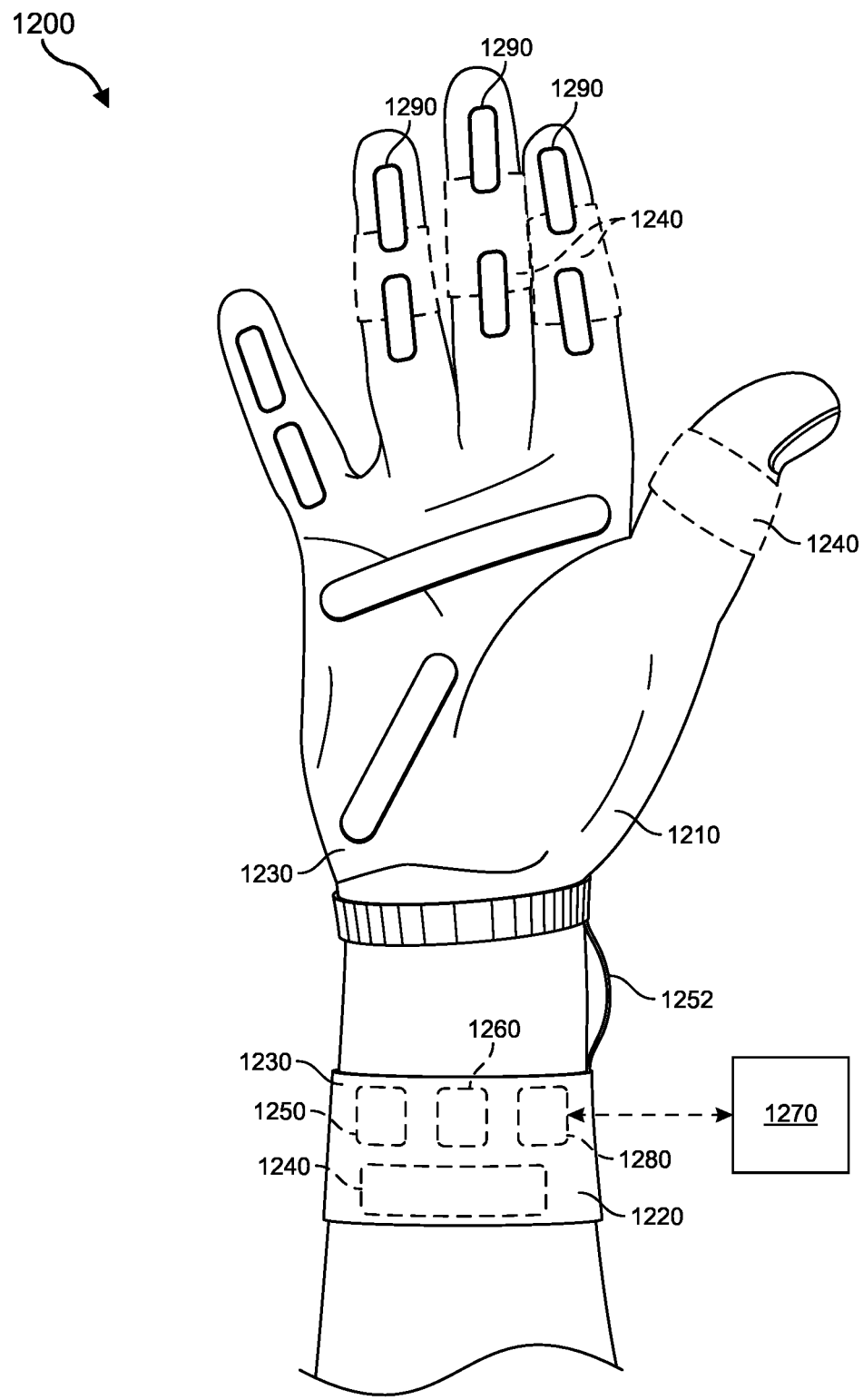
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, BLUETOOTH, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
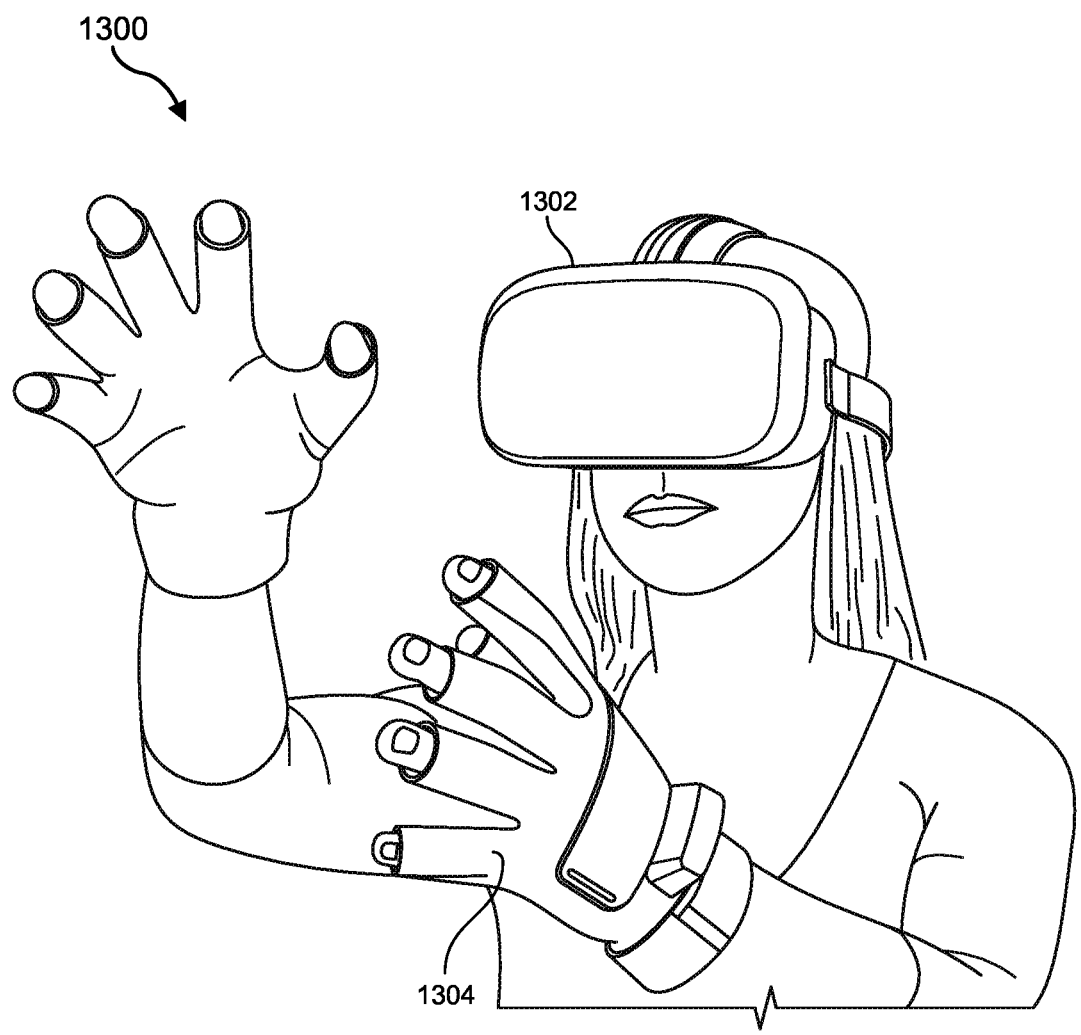
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
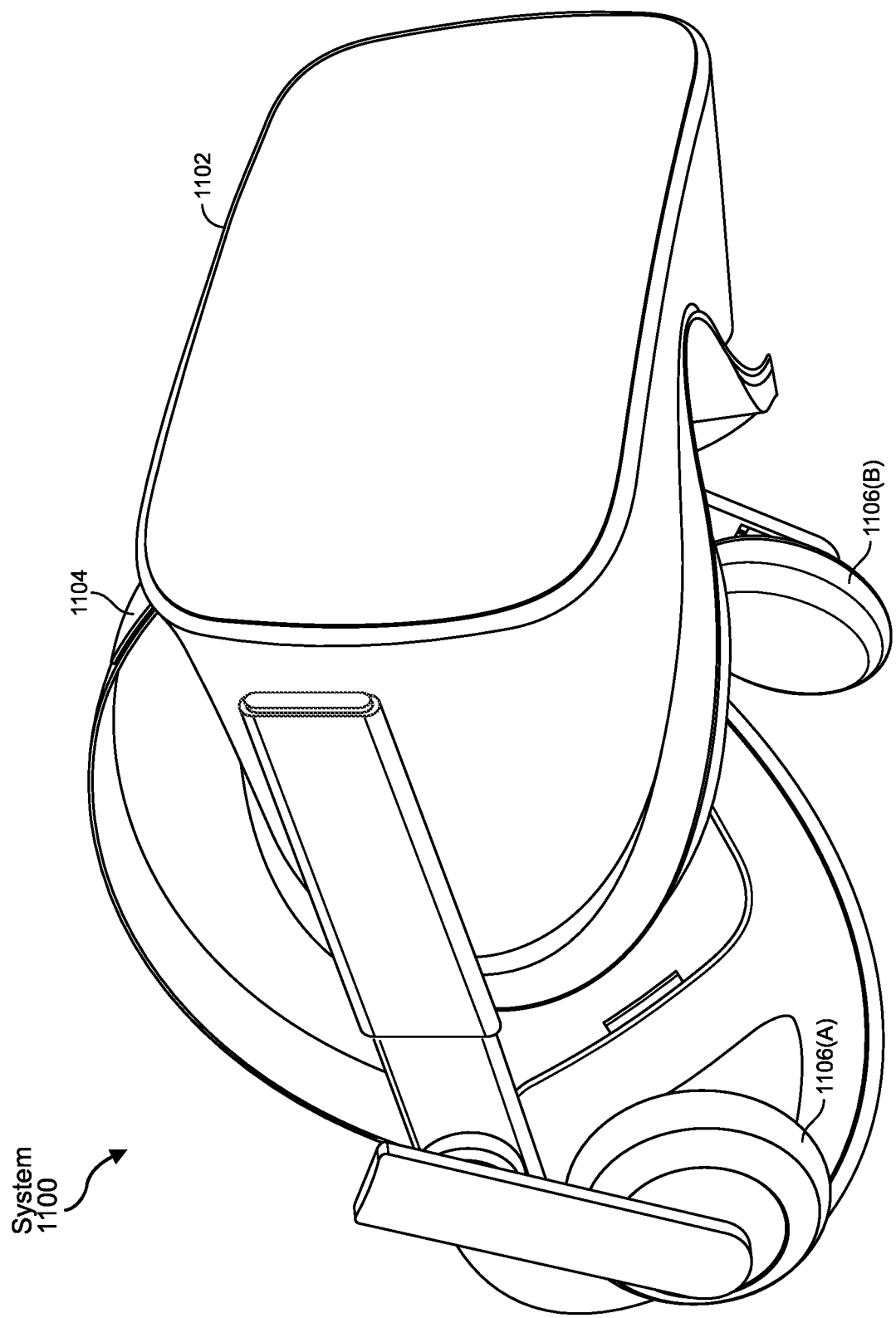
FIG. 11 is an illustration of an exemplary virtual-reality headset that may be used in connection with embodiments of this disclosure.

Head-mounted display 1302 generally represents any type or form of virtual-reality system, such as virtual-reality system 1100 in FIG. 11. Haptic device 1304 generally represents any type or form of wearable device, worn by a user of an artificial-reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
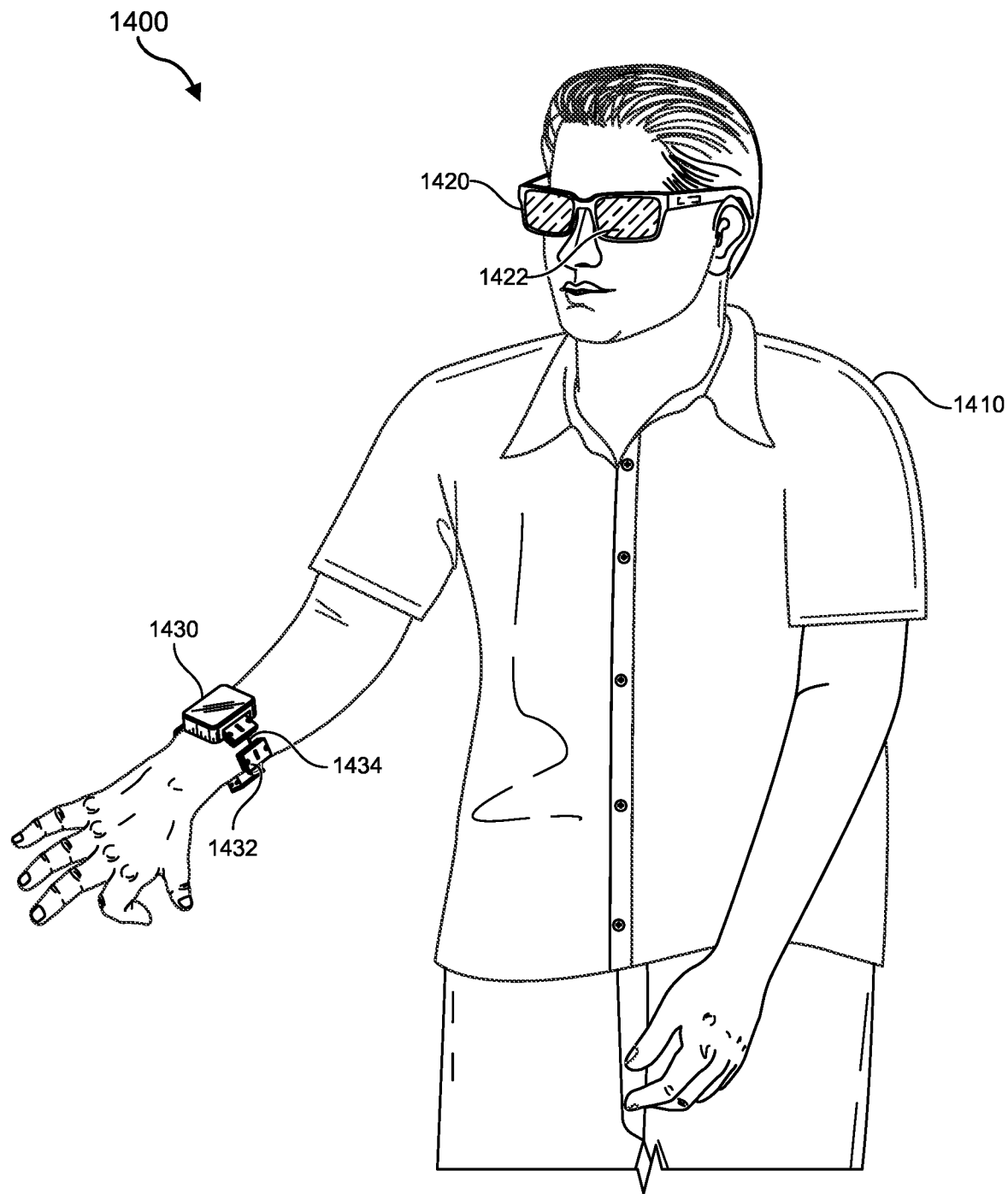
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view of a user 1410 interacting with an augmented-reality system 1400. In this example, user 1410 may wear a pair of augmented-reality glasses 1420 that may have one or more displays 1422 and that are paired with a haptic device 1430. In this example, haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

Figure 15A:
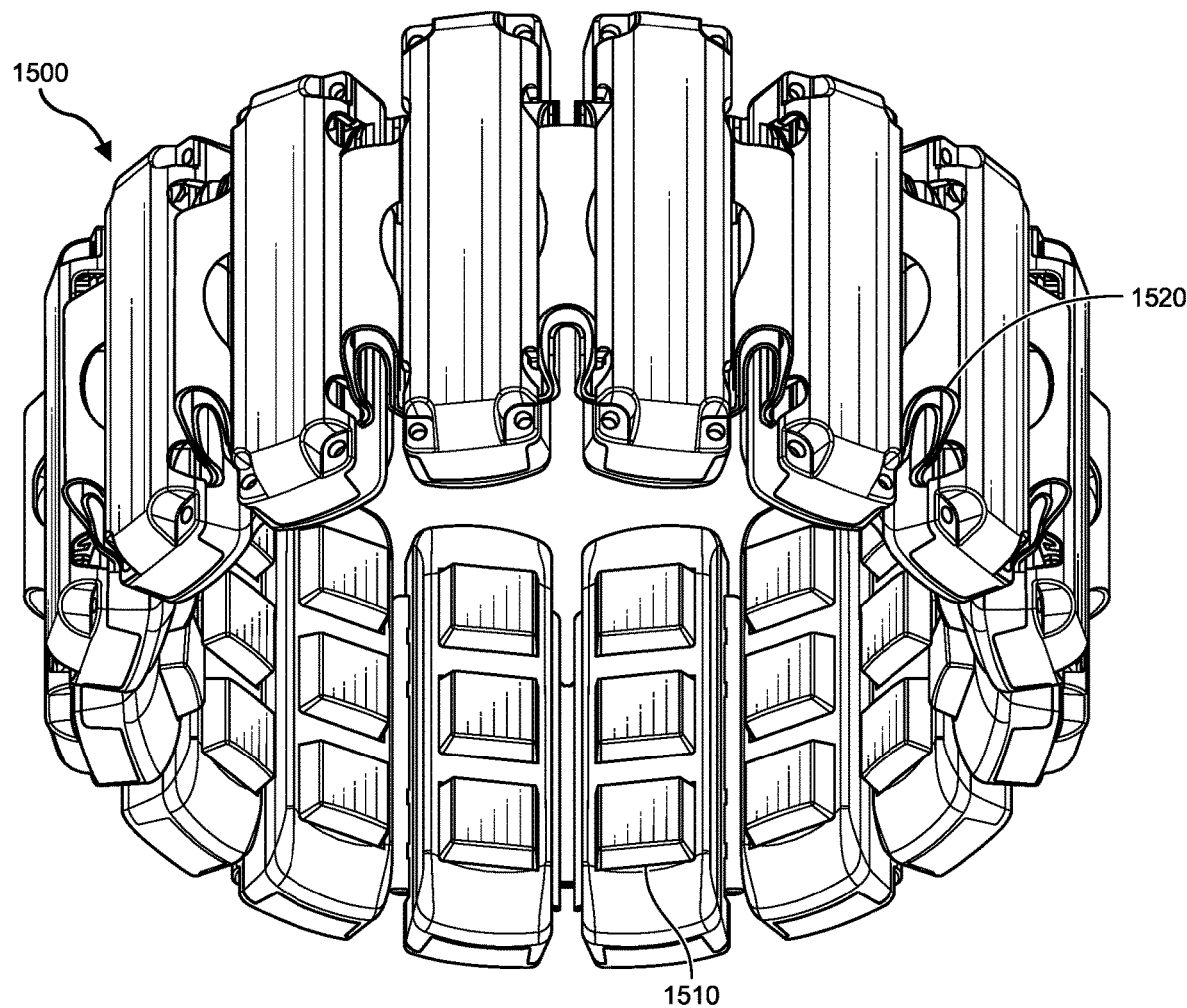
FIGS. 15A and 15B are illustrations of an exemplary human-machine interface configured to be worn around a user's lower arm or wrist.
Figure 15B:
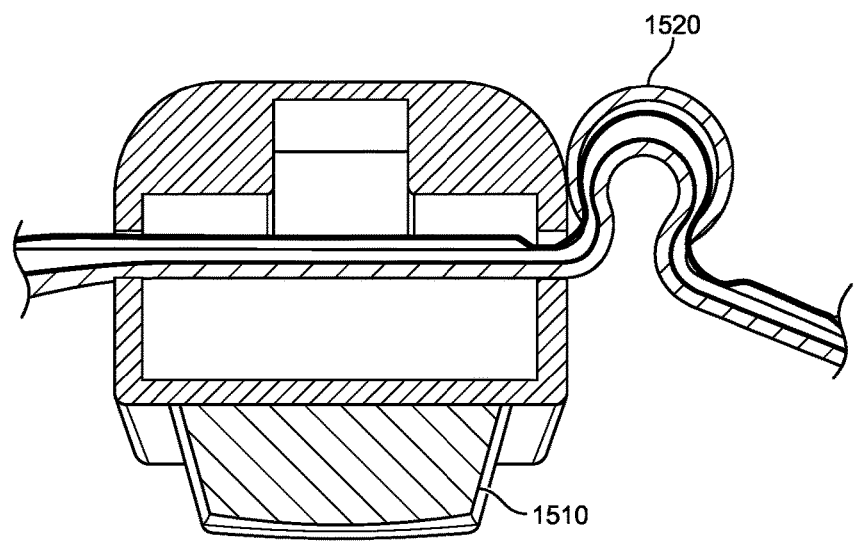

FIG. 15A illustrates an exemplary human-machine interface (also referred to herein as an EMG control interface) configured to be worn around a user's lower arm or wrist as a wearable system 1500. In this example, wearable system 1500 may include sixteen neuromuscular sensors 1510 (e.g., EMG sensors) arranged circumferentially around an elastic band 1520 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 15B illustrates a cross-sectional view through one of the sensors of the wearable device shown in FIG. 15A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1510 is discussed in more detail below with reference to FIGS. 16A and 16B.

FIGS. 16A and 16B illustrate an exemplary schematic diagram with internal components of a wearable system with EMG sensors. As shown, the wearable system may include a wearable portion 1610 (FIG. 16A) and a dongle portion 1620 (FIG. 16B) in communication with the wearable portion 1610 (e.g., via BLUETOOTH or another suitable wireless communication technology). As shown in FIG. 16A, the wearable portion 1610 may include skin contact electrodes 1611, examples of which are described in connection with FIGS. 15A and 15B. The output of the skin contact electrodes 1611 may be provided to analog front end 1630, which may be configured to perform analog processing (e.g., amplification, noise reduction, filtering, etc.) on the recorded signals. The processed analog signals may then be provided to analog-to-digital converter 1632, which may convert the analog signals to digital signals that can be processed by one or more computer processors. An example of a computer processor that may be used in accordance with some embodiments is microcontroller (MCU) 1634, illustrated in FIG. 16A. As shown, MCU 1634 may also include inputs from other sensors (e.g., IMU sensor 1640), and power and battery module 1642. The output of the processing performed by MCU 1634 may be provided to antenna 1650 for transmission to dongle portion 1620 shown in FIG. 16B.

Dongle portion 1620 may include antenna 1652, which may be configured to communicate with antenna 1650 included as part of wearable portion 1610. Communication between antennas 1650 and 1652 may occur using any suitable wireless technology and protocol, non-limiting examples of which include radiofrequency signaling and BLUETOOTH. As shown, the signals received by antenna 1652 of dongle portion 1620 may be provided to a host computer for further processing, display, and/or for effecting control of a particular physical or virtual object or objects.

Although the examples provided with reference to FIGS. 15A-15B and FIGS. 16A-16B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a plurality of electronic components;
   a plurality of charger battery modules, wherein each charger battery module includes:
      at least one battery configured to drive a subset of electronic components within the plurality of electronic components;
      at least one battery charger configured to charge the battery;
      a machine learning module configured to train a machine learning model that is specific to the subset of electronic components managed by the charger battery module; and
      a microcontroller configured to control the charging and discharging of the battery, wherein the microcontroller controls charging for specific electronic components among the subset of electronic components according to a determined priority, such that more heavily used electronic components receive higher prioritized charging over other electronic components based on patterns of usage; and
   a central controller configured to control the plurality of charger battery modules through the charger battery module's associated microcontroller.

2. The system of claim 1, wherein at least one of the charger battery modules is positioned adjacent a specified electronic component in the system.

3. The system of claim 1, wherein the microcontroller regulates charging and discharging according to load usage of the electronic components.

4. The system of claim 1, wherein the microcontroller is part of a system on a chip (SoC).

5. The system of claim 1, wherein at least one of the microcontroller or the central controller are configured to implement machine learning to learn which electronic components are being used.

6. The system of claim 5, wherein at least one of the microcontroller or the central controller are configured to implement machine learning to learn how the electronic components are being used.

7. The system of claim 5, wherein the machine learning is implemented to adaptively adjust charging or discharging of the battery based on current electronic component usage.

8. The system of claim 5, wherein the machine learning is implemented to adaptively adjust charging or discharging of the battery based on a specific type of electronic component usage.

9. The system of claim 1, wherein the central controller prioritizes charging or discharging for a specified electronic component.

10. The system of claim 1, wherein at least one of the microcontroller or the central controller change a charging or discharging profile for each battery type.

11. The system of claim 1, wherein at least one of the charger battery modules includes a separate housing that houses the battery, the battery charger, and the microcontroller.

12. The system of claim 11, wherein the plurality of charger battery modules are electronically linked to each other and separately to the central controller.

13. An apparatus comprising:
a plurality of electronic components;
a plurality of charger battery modules, wherein each charger battery module includes:
  at least one battery configured to drive a subset of electronic components within the plurality of electronic components;
  at least one battery charger configured to charge the battery;
  a machine learning module configured to train a machine learning model that is specific to the subset of electronic components managed by the charger battery module; and
  a microcontroller configured to control the charging and discharging of the battery, wherein the microcontroller controls charging for specific electronic components among the subset of electronic components according to a determined priority, such that more heavily used electronic components receive higher prioritized charging over other electronic components based on patterns of usage; and
a central controller configured to control the plurality of charger battery modules through the charger battery module's associated microcontroller.

14. The apparatus of claim 13, wherein the central controller applies one or more charge profiles on specific charger battery modules.

15. The apparatus of claim 14, wherein applied charge profile is selected based on one or more current external conditions.

16. The apparatus of claim 14, wherein applied charge profile is selected based on previous electronic component usage patterns.

17. The apparatus of claim 13, wherein the central controller prioritizes charging using a specified charger battery module, while avoiding charging on at least one specified charger battery module.

18. The apparatus of claim 13, wherein the apparatus comprises an artificial reality device that includes at least one camera and one or more audio speakers.

19. A method of manufacturing comprising:
providing a plurality of electronic components;
assembling a plurality of charger battery modules, wherein each charger battery module includes:
  at least one battery configured to drive a subset of electronic components with the plurality of electronic components;
  at least one battery charger configured to charge the battery;
  a machine learning module configured to train a machine learning model that is specific to the subset of electronic components managed by the charger battery module; and
  a microcontroller configured to control the charging and discharging of the battery, wherein the microcontroller controls charging for specific electronic components among the subset of electronic components according to a determined priority, such that more heavily used electronic components receive higher prioritized charging over other electronic components based on patterns of usage; and
providing a central controller configured to control the plurality of charger battery modules through the charger battery module's associated microcontroller.

20. The method of manufacturing of claim 19, wherein at least one of the charger battery modules is assembled adjacent to at least one electronic component.

* * * * *